(12) United States Patent
Batenin

(10) Patent No.: US 8,042,184 B1
(45) Date of Patent: Oct. 18, 2011

(54) RAPID ANALYSIS OF DATA STREAM FOR MALWARE PRESENCE

(75) Inventor: Vyacheslav A. Batenin, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 1050 days.

(21) Appl. No.: 11/550,428

(22) Filed: Oct. 18, 2006

(51) Int. Cl.
- *G06F 11/00* (2006.01)
- *G06F 11/30* (2006.01)
- *G06F 13/00* (2006.01)
- *G08B 23/00* (2006.01)

(52) U.S. Cl. ........ 726/24; 726/22; 726/23; 726/25; 713/188; 711/100; 711/113; 711/118; 711/147; 711/148

(58) Field of Classification Search .......... 726/22–25; 710/52, 56; 713/188; 711/100–173
See application file for complete search history.

(56) References Cited

U.S. PATENT DOCUMENTS

| | | | |
|---|---|---|---|
| 5,319,776 A | | 6/1994 | Hile et al. |
| 6,088,803 A | | 7/2000 | Tso et al. |
| 6,658,525 B1 | * | 12/2003 | Huang et al. ............ 711/109 |
| 6,993,604 B2 | * | 1/2006 | Dixon ..................... 710/56 |
| 7,448,085 B1 | * | 11/2008 | Reyes et al. ............ 726/26 |
| 2002/0133249 A1 | * | 9/2002 | Fay et al. ................ 700/94 |
| 2002/0199115 A1 | * | 12/2002 | Peterson et al. ......... 713/201 |
| 2003/0145228 A1 | | 7/2003 | Suuronen et al. |
| 2005/0097358 A1 | | 5/2005 | Yanovsky |
| 2005/0114700 A1 | * | 5/2005 | Barrie et al. ............ 713/201 |
| 2005/0289254 A1 | * | 12/2005 | Chien .................... 710/52 |
| 2006/0080467 A1 | * | 4/2006 | Gould et al. ............ 709/250 |
| 2006/0206939 A1 | * | 9/2006 | Chang et al. ........... 726/22 |

\* cited by examiner

*Primary Examiner* — Taghi Arani
*Assistant Examiner* — Madhuri Herzog
(74) *Attorney, Agent, or Firm* — Bardmesser Law Group

(57) ABSTRACT

A system, method and computer program product for anti-malware processing of data stream that includes a plurality of logical data streams formed from a primary data stream; and a plurality of stream buffers, each buffering data of a corresponding logical data stream. A plurality of processing handlers each associated with one of the data streams, where the handlers are processing the data of the logical data stream buffered by its stream buffer. Each processing handler is associated with a particular functionality and at least one processing handler scans its logical data stream for malware presence. Each stream buffer has a configurable buffering policy. At least one of the processing handlers decompresses the data into one or more secondary streams. At least one of the processing handlers parses its logical data stream, creating one or more instances of secondary data streams. The scanning can be based on a signature search. At least one of the processing handlers parses its logical data stream to identify headers, wherein new secondary data streams are instantiated based on regions of interest in a future stream data at positions identified by the headers. The set of conditions is stored e.g., in a table, a list, and/or a registry.

29 Claims, 12 Drawing Sheets

RAPID ANALYSIS OF DATA STREAM FOR MALWARE PRESENCE

BACKGROUND OF THE INVENTION

1. Field of the Invention

The present invention relates to computer security, more particularly, to anti-virus protection of computer networks.

2. Description of the Related Art

Network gateways with anti-virus processing capabilities are widely used in computer networks. The traditional model of operation of these gateways involves scanning content data objects, passed through commonly used protocols, such as HTTP, FTP, SMTP, POP3 and the like. In order to perform anti-virus/anti-malware processing of data objects in the data stream, anti-virus gateways usually need to assemble the contents of data objects that are passing through the connection (e.g., files, HTML pages, email messages, etc). The need to assemble the entire data object limits scalability of anti-virus/anti-malware gateway solutions because the amount of memory required to store entire data objects can become very large for systems serving many connections and capable of analyzing large data objects.

To address this problem, a different approach to anti-virus scanning has been developed: "stream anti-virus scanning" Such systems work by analyzing stream content segment by segment, without assembling the entire transferred data object. Typically, different stages of processing stream data, e.g., decompressing, MIME parsing, virus checking, etc., can be interleaved, thus reducing the processing latency of each segment. In some hardware implementations, processing stages can be implemented with hardware assistance to improve performance. Examples of such conventional stream anti-virus scanning systems include SonicWall Deep Packet Inspection Engine (http://www.sonicwall.com), CP Secure stream anti-virus processors (http://www.cpsecure.com), etc.

FIG. 1 illustrates the structure of a conventional stream anti-virus processing system 101, which includes a forwarding module 102 and an analysis module 103. At time 1 (see circled "1"), an input packet 104 is received by the system 101 via connection 105. At time 2 (see circled "2"), the contents of the packet 104 are placed into a packet queue 106 and are made available for processing by the analysis module 103. During the processing, the analysis module 103 may perform additional data buffering required for anti-virus analysis algorithms, utilizing an internal buffer 107. At time 3 (see circled "3"), the analysis module 103 notifies a forwarding module 102 that a certain amount of queued data is considered 'safe' and can be transferred to an output connection 109. At time 4 (see circled "4"), the forwarding module 102 creates and sends an output packet 108 to the output connection 109 and discards its contents from the packet queue 106.

Depending on the internal system 101 architecture, the packet queue 106 and the internal buffer 107 may utilize the same memory area for storing packets, thus avoiding the overhead of copying data between the modules.

Note that when transmitted through networks, the data often undergoes additional processing, such as encoding, compression, addition of headers for the relevant protocols, etc., which is usually determined by the protocol used to transmit the data, such as HTTP, SMTP, etc. Thus, a stream scanning system needs to have a means for extracting data objects for anti-virus analysis from the data stream that has been processed/encoded/encapsulated, etc. for the relevant network protocols.

FIG. 2 illustrates an example of analysis of a data stream that contains an email message encoded using the format RFC822, which is commonly used for transmission of messages in standard email protocols, such as SMTP, POP3 and IMAP. The incoming protocol data stream 201, which represents the incoming bits comprising the message, transmitted using the mail protocol, is processed using an analyzer for the appropriate format (here, RFC822/MIME) 202. The analyzer 202 identifies the structure of the email and separates it into fragments, for example, the body of the email 203 (in this example transmitted in HTML format), and the attached file 204 (in this example archived in the zip format).

The data relating to the body of the email message 203 is processed by an HTML analyzer 205, whose primary purpose is anti-virus analysis of the script and other objects present in the HTML part of the email. The attached file 204 is first processed by the unpacking module 206, which extracts from the archive the data relating to the files in the archive (in this example, the executable file 207 and a Microsoft Word document 208). The contents of the executable file 207 is sent for processing to the executable file analyzer 209, while the contents of the MS Word file 208 is sent for analysis to the file analyzer 210, that parses files having OLE2 document format. The analyzers 208 and 210 analyze the contents of the file, based on virus signatures, and other rules relating to their particular formats.

In conventional stream analysis systems, the processing and analysis modules (in this example, the modules 202, 205, 206, 209 and 210) need to process data portion by portion, without waiting for the entire data object to be received. This is due to the fact that many of the attachments can be fairly large, with current email technology, multi megabyte attachments are not uncommon, and even attachments that are tens of megabytes in size (or several attachments that collectively add up to several tens of megabytes) are not uncommon. Therefore, the design of such stream analysis systems must conform to certain architectural requirements.

One of the requirements is being able to effectively manage buffer memory. Another requirement is being able to reconfigure the stream processing logic to handle new threat types during regular updates of the system configuration.

Stream processing anti-virus scanning has its limitations. Many types of anti-virus analysis algorithms require access not only to the currently available data segment but also to some other portions of the data object being analyzed. Locations and sizes of these data objects, such as email attachments, cannot be determined in advance. Usually anti-virus algorithms request access to certain file areas dynamically, depending on the results of the previous analysis.

Accordingly, there is a need in the art for a system and method for rapid scanning of data streams for viruses and other forms of malware, particularly data streams that contain large and complex data objects, including packed, encoded and encrypted data objects. Such a system and method must not require an infinite amount of memory for buffering of the stream data and must dynamically and efficiently manage the available buffer memory. Also, there is a need in the art for a system and method that can be easily reconfigured for new types of data encoding and transmission and new types of malware.

SUMMARY OF THE INVENTION

Accordingly, the present invention is related to a system and method for rapid analysis of a data stream containing complex data objects that substantially obviates one or more of the disadvantages of the related art.

In one aspect of the invention, there is provided a system, method and computer program product for anti-malware processing of a data stream that includes a plurality of secondary data streams formed from a primary data stream, each data stream associated with a stream buffer that performs data buffering for the corresponding data stream. A plurality of processing handlers is associated with the data streams. The processing handlers receive the data from the stream buffer associated with the data stream. Each processing handler performs predefined actions on the received data, such as parsing the data transmission format (e.g., HTTP, FTP, SMTP, POP3, IRC, IMAP, MIME, HTML, ZIP, GZIP, RAR, ARJ, etc.), and scanning the received data for malware presence, typically using a signature search. A set of conditions for creation of new instances of data streams is stored in a list, a table, or a registry.

In a further optional aspect, each stream buffer has a configurable buffering policy that is defined when the instance of the data stream is created, or defined at the time of registration of its parameters in a registry. The buffering policy can include information about the maximum buffer size, whether the stream must be fully buffered, a size of a backtrack buffer, relative importance of buffered data and whether the buffered data may be discarded when available memory is low. At least one of the processing handlers transforms the data into a different format (for example, decompressing the input data or parsing a multi-part data format), creates one or more instances of secondary data streams and outputs the transformed data into these secondary data streams.

At least one of the processing handlers can employ signature search techniques to perform anti-virus analysis. Signature search is a widely used approach to detect known examples of malware. Signature search algorithms use sets of known malware signatures in the form of "signature databases" and perform simultaneous search of known signatures in the stream data.

At least one of the processing handlers can optionally perform resource-intensive operations (e.g., signature searching) employing hardware acceleration, when the corresponding hardware resources are available.

In a further optional aspect of the invention, each stream buffer keeps track of the amount of data consumed by processing handlers that it instantiated and it manages. New instances of data streams are created based on logical data stream offset, and the action to be performed when the new instance of a logical data stream is created is defined at the time of instantiation of the logical data stream. The processing handler(s) can parse its corresponding data stream header to identify the structure of the stream, and new secondary data streams can be instantiated based on the regions of interest in the data stream that has not been received yet (but is known to be located at specific offsets, identified through parsing stream headers). The set of conditions for instantiating new stream buffers is stored in, e.g., a table, a list and/or a registry.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
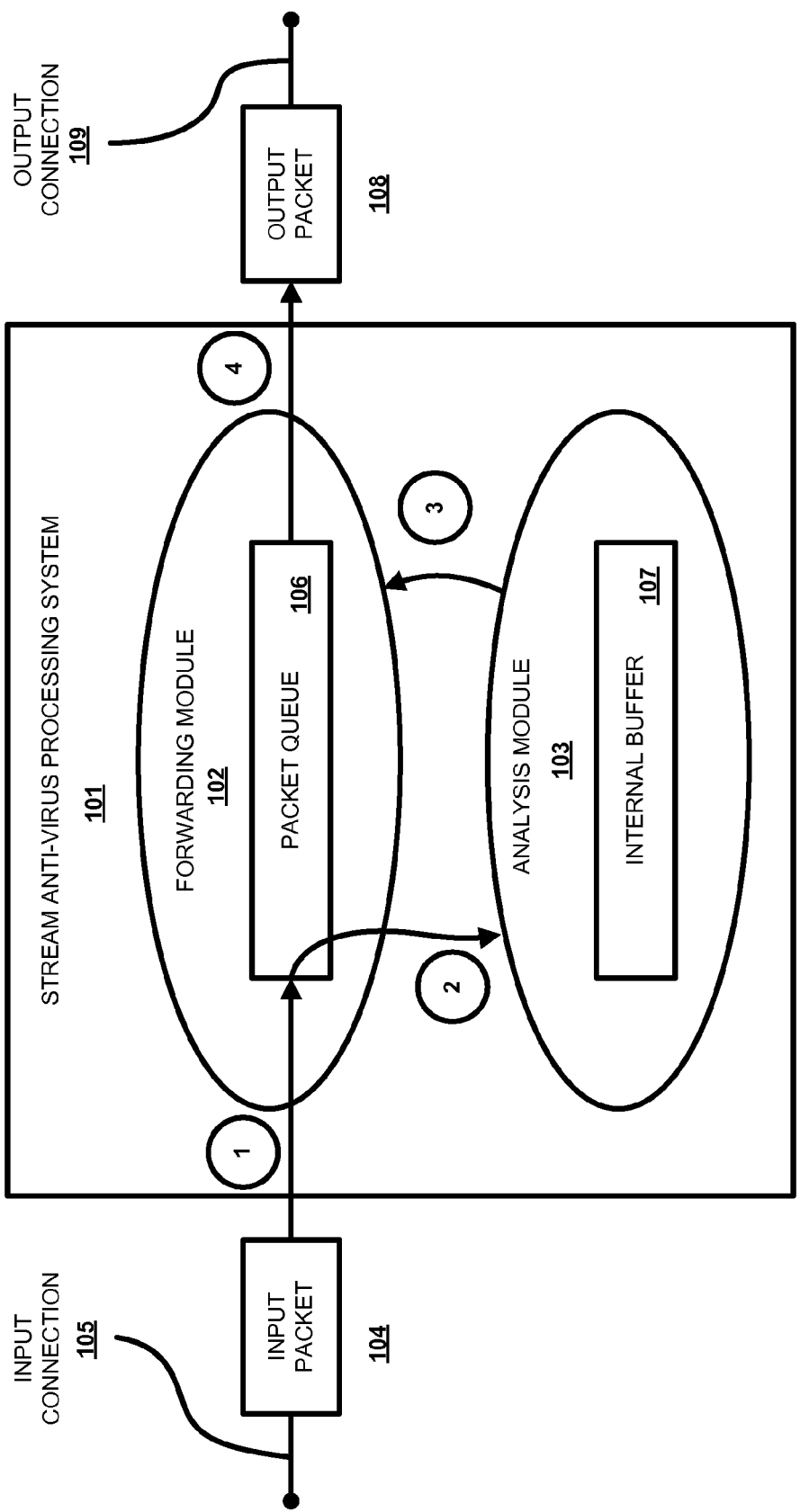
FIG. 1 illustrates a conventional stream anti-virus processing system.
Figure 2:
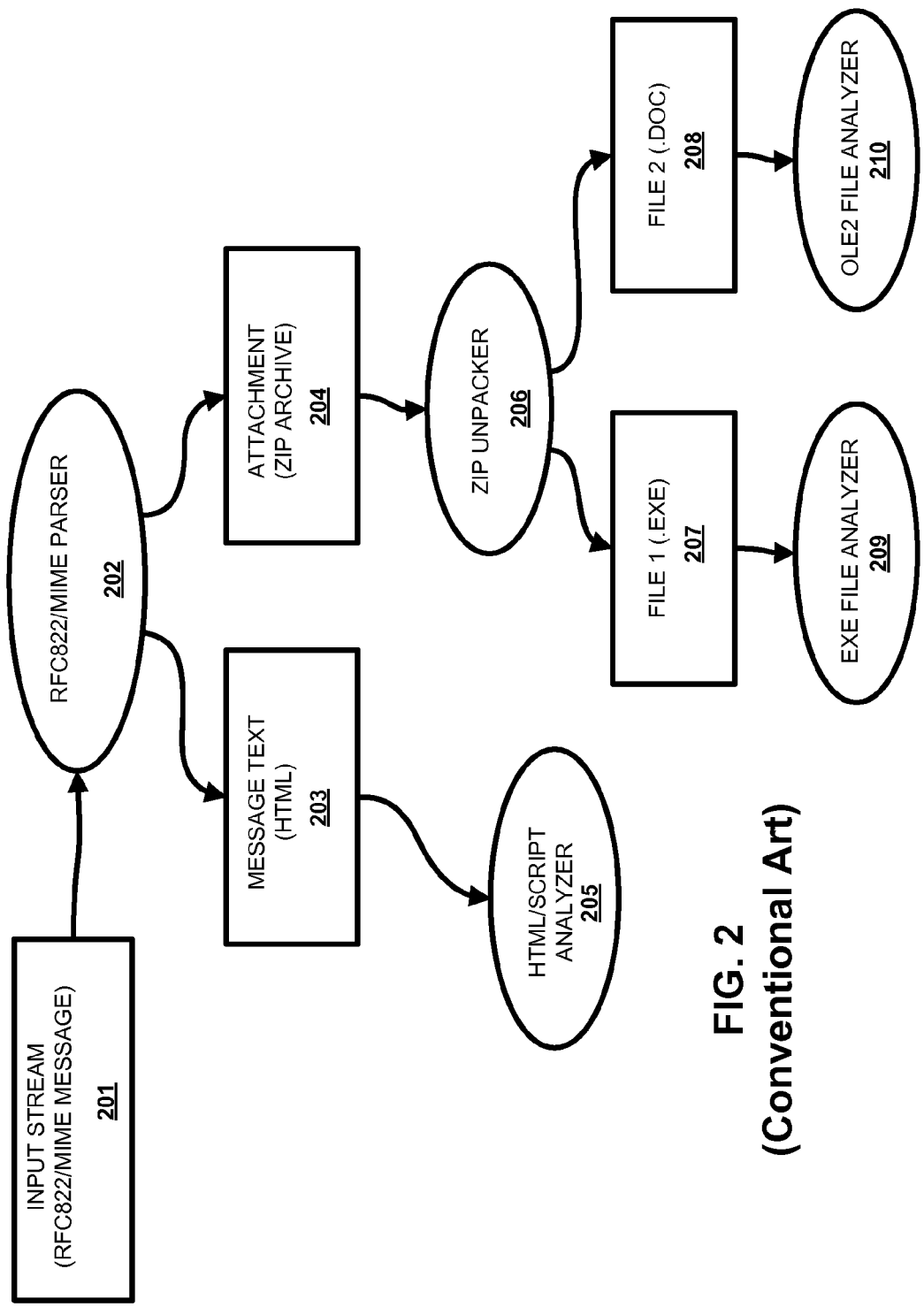
FIG. 2 illustrates an example of operation of a conventional stream processing system.

Reference will now be made in detail to the preferred embodiments of the present invention, examples of which are illustrated in the accompanying drawings.

In the discussion below, the following terminology is used regarding data streams. Network anti-virus scanners usually receive data in form of network packets (for example, IP protocol packets). To perform anti-malware analysis, the content of these packets must be assembled into a "stream," corresponding to a transport protocol connection between networked systems. Typically, a network protocol scanner performs this using the process known as "TCP stream reassembly." The resulting stream is referred to below as a "primary" data stream. The content of the primary data stream corresponds to some known protocol format, e.g., HTTP, SMTP and the like. In the discussion below, the assembly of the primary data stream is performed by the forwarding module 102. The content of the primary stream is passed portion by portion (as the stream is assembled) to the stream analysis module 103 for anti-malware analysis. The forwarding module may perform additional protocol analysis, for example, splitting SMTP protocol data stream into a sequence of individual RFC822-formatted messages. In this case the analysis module 103 will receive multiple primary streams, where each primary stream corresponds to an individual message. Thus, the exact content of the primary stream is a matter of coordination between the design of the forwarding module 102 and the analysis module 103.

A primary data stream can be divided into several logical (secondary) data streams, such that each of the secondary data stream can represent some meaningful portion of the primary data stream—for example, the body of the email, the archived attachment, etc, or the result of some transformation (decompression, decoding, etc) of stream data. Since the secondary data stream can itself contain complex data objects, it can in turn be transformed into tertiary data streams, etc.—however, for simplicity, tertiary, quaternary, etc. data streams that are "born" from a secondary data stream are also referred to as "secondary data streams."

Generally, the invention is broadly applicable to content scanning of the data stream. This can be generally scanning for malware, or, e.g., scanning for particular types of malware, such as scanning for viruses, spam, trojans, rootkits, worms, adware, etc. In the discussion, the example of anti-virus scanning is used for illustration.

An architecture of a flexible stream-based anti-malware processing system is described below. The approach described herein permits implementing different scenarios for anti-malware processing, such as for different network protocols and data formats, supporting processing of secondary streams, which may require additional processing, etc. The approach also permits dynamic control over the scanning process, for example, by reconfiguring the scanning scenario for different processing algorithms, for different data formats and protocols, different regions of the data stream, etc. This is particularly useful where the data objects being scanned have a complex structure, including encoded files, compressed files, password-protected files and so on. Furthermore, the system has the advantage of flexibility and can be easily re-configured to counter new kinds of malware and unwanted content, which may require new types of algorithms for detection. Furthermore, new data formats and protocols can appear, which can be easily integrated into the system and method described herein, given the flexibility of the approach.

The present invention, in one aspect, is directed to implementation of the analysis module of a stream scanning system.

In one embodiment of the invention, the system controls a set of logical data streams, each of which can have a number of stream processing handlers. Each data stream has its own instance of a stream buffer. Each instance of a stream buffer has an associated buffer management policy that specifies the rules for allocating and freeing memory blocks for this instance of stream buffer. Stream processing handlers are typically associated with a particular processing algorithm, for example, decoding, decompressing or scanning stream data. Stream processing handlers can schedule creation and deletion of new instances of data streams and/or registration and deregistration of processing handlers, tied to particular regions in the stream data (already received, or expected in the future). The system manages the registry of stream regions and performs actions associated with specific region (including creation of new logical data streams and/or registering new processing handlers, when the data corresponding to this region becomes available).

Figure 3A:
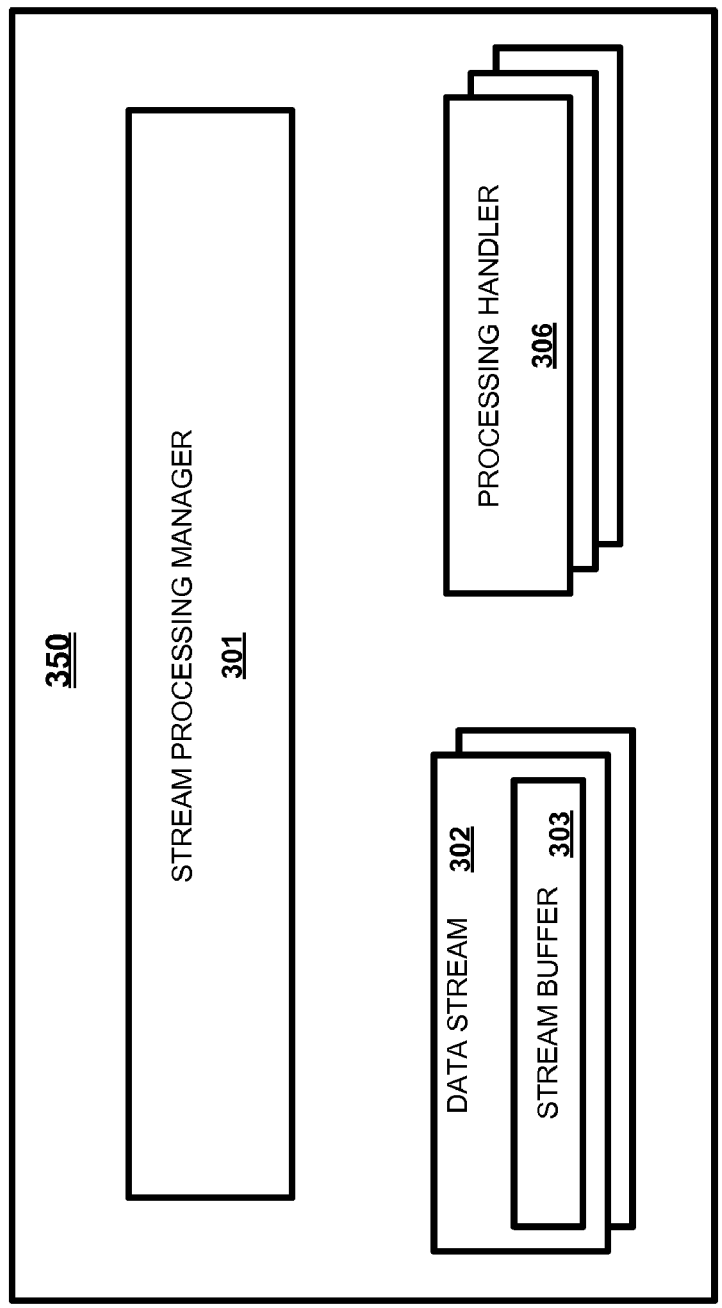
FIG. 3A illustrates a general system architecture for stream anti-virus processing.

FIG. 3A illustrates a general architecture of one embodiment of the invention. As shown in FIG. 3A, a stream processing system 350 includes a stream processing manager 301, a plurality of data streams 302, each of which is associated with a corresponding stream buffer 303, and a plurality of processing handlers 306. Each data stream 302 can be associated with one or with several processing handlers 306. During routine operation the system 350 can instantiate new data streams 302 and processing handlers 306, "kill" the existing ones, as well as associate and de-associate the data streams 302 and processing handlers 306.

Figure 3B:
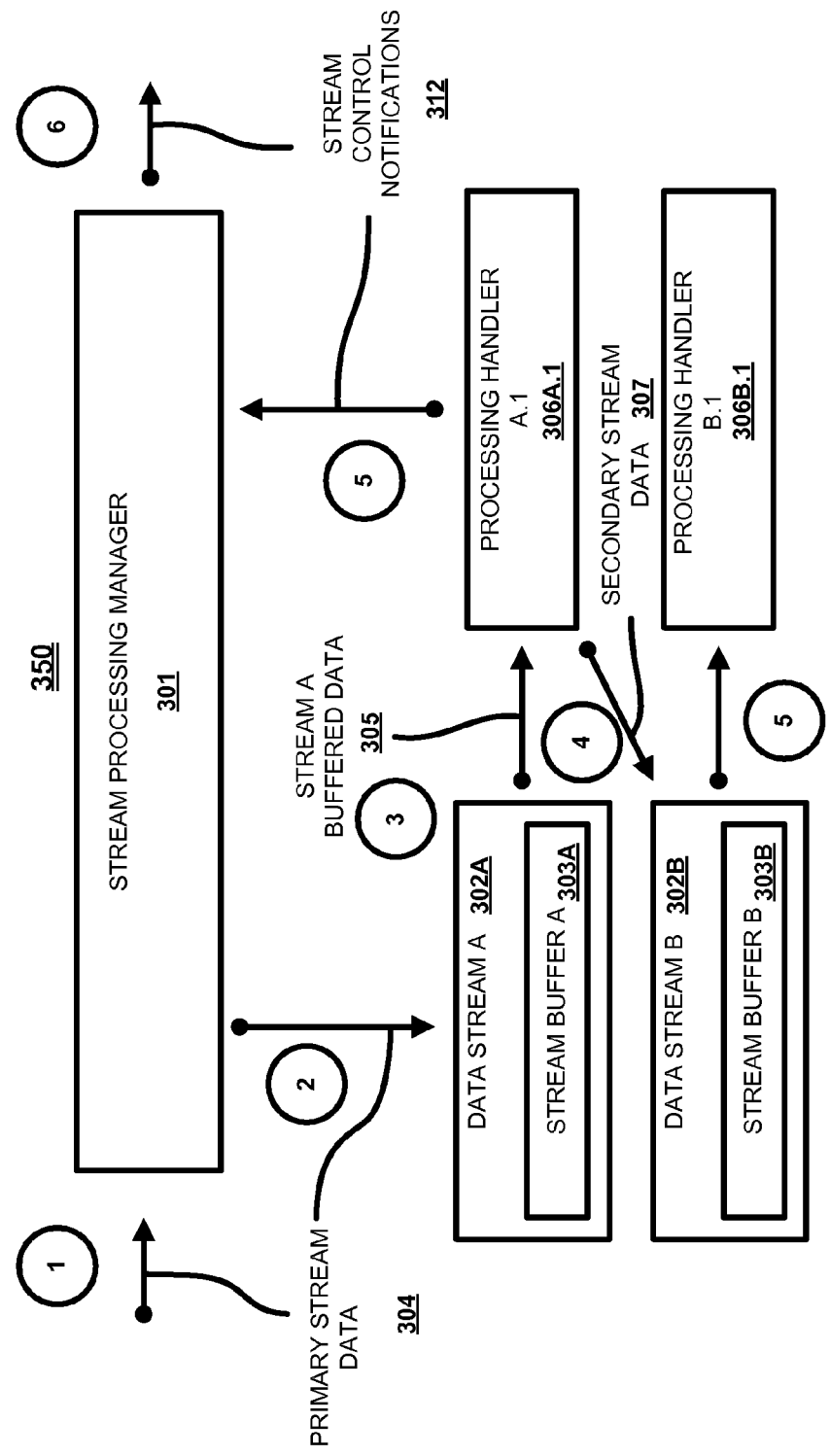
FIG. 3B illustrates one embodiment of a stream processing manager of the present invention.

FIG. 3B illustrates one possible embodiment of the invention. A stream processing system 350, which is typically a part of the analysis module 103, such as shown in FIG. 1, includes the following parts:

(a) a stream processing manager 301 that coordinates stream processing activities and manages other data structures.

(b) multiple logical data streams, 302, each of which is associated with the stream buffer that controls buffering of the content data for the corresponding data stream.

(c) multiple processing handlers 306, such that each data stream 302 can have multiple handlers associated with it.

The stream processing manager 301 receives data corresponding to a primary stream 304 from a network/protocol stream control module (e.g., forwarding module 102 of FIG. 1). During anti-virus processing the system 350 generates a set of stream control notifications 312 as its output. The control notifications 312 are transmitted to the forwarding module 102, typically in the form of the procedure or function calls. The notifications 312 contain information about which portions of the primary data stream 304 can be forwarded to the recipient in the form of the output packet 108. If malware has been detected, a different type of stream control notification 312 is generated, which reflects that fact. In this case, the forwarding module 102 can perform some predefined actions, for example, break connection to the recipient, generate an alert, etc.

In the present invention, the anti-virus analysis module 103 during parsing and transformation of the primary stream data may create one or more instances of secondary data streams, such that each of the secondary data stream can represent a meaningful portion of the primary data stream—for example, the body of the email, archived attachment, etc, or result of some transformation (decompression, decoding, etc) of stream data.

An exemplary procedure for stream processing is as follows:

At time 1, a segment of data is received from the primary stream 304 (for example, with the help of forwarding module 102). At time 2, the stream processing manager 301 transfers the received segment to the data stream 302A which buffers the data using associated stream buffer 303A.

At time 3, the primary stream data 304 buffered in the stream buffer 303A is passed to the processing handler 306A.1 associated with the primary data stream 302A (see 305).

At time 4, the processing handler 306A.1 (for example, a decompression/unpacking module) produces a portion of unpacked data (see 307) that is passed to the secondary data stream 302B, which places the data into its associated stream buffer 303B At time 5, the data from the stream buffer 303B associated with data stream 302B is passed to a processing handler 306B.1, which performs the anti-virus analysis of the secondary stream data (307), detects a malicious object (for example, presence of viruses, trojans, worms, rootkits, other unwanted content, etc.) and sends notification to the stream processing manager 301. At time 6, the stream processing manager 301 sends an appropriate notification 312 to the external module (for example, forwarding module 102).

Figure 4A:
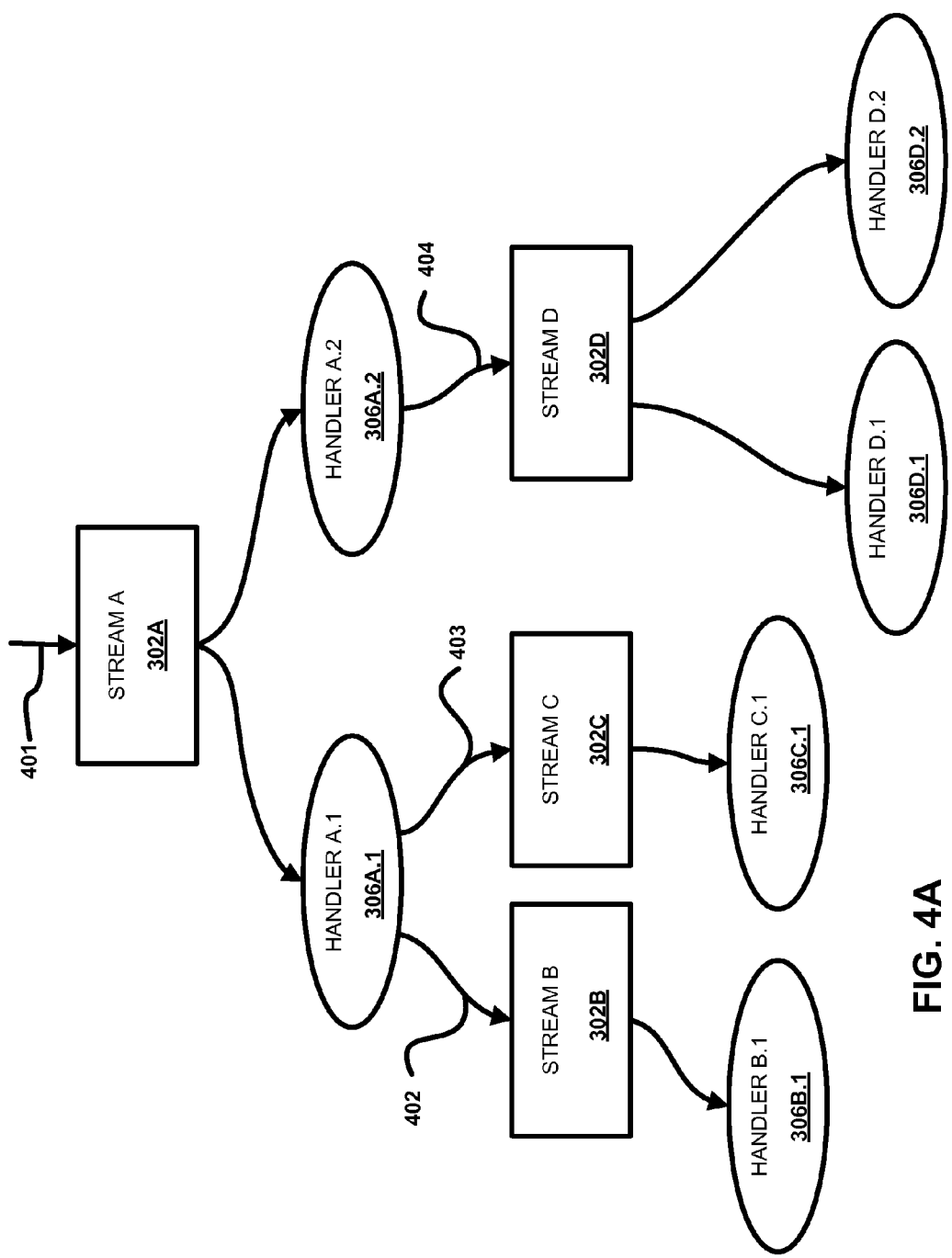
FIG. 4A illustrates an example of logical hierarchy of data streams and processing handlers during processing of HTML data stream in one embodiment of the invention.

In one embodiment of the invention, data streams 302 and stream processing handlers 306 may form a hierarchy. FIG. 4A illustrates a generic example of such a hierarchy.

Here, data stream "STREAM A" (302A) receives data 401 directly from the input data stream and is therefore called "primary data stream".

It has two associated processing handlers: HANDLER A.1 (306A.1) and HANDLER A.2 (306A.2). Thus, the data buffered by stream buffer of STREAM A (302A) is passed both to HANDLER A.1 (306A.1) and HANDLER A.2 (306A.2).

HANDLER A.1 (306A.1) produces two different output data streams (see 402, 403) that are buffered by STREAM B (302B) and STREAM C (302C).

Both data streams STREAM B (302B) and STREAM C (302C) have a single associated processing handler each: HANDLER B.1 (306B.1) and HANDLER C.1 (306C.1), respectively.

HANDLER A.2 (306A.2) produces a single output data stream 404 buffered by the STREAM D (302D) which has two associated processing handlers: HANDLER D.1 (306D.1) and HANDLER D.2 (306D.2).

HANDLER B.1 (306B.1), HANDLER C.1 (306C.1), HANDLER D.1 (306D.1), HANDLER D.2 (306D.2) do not produce any output data streams (for example, they may perform anti-virus checking or some other function that does not generate any output data).

Figure 4B:
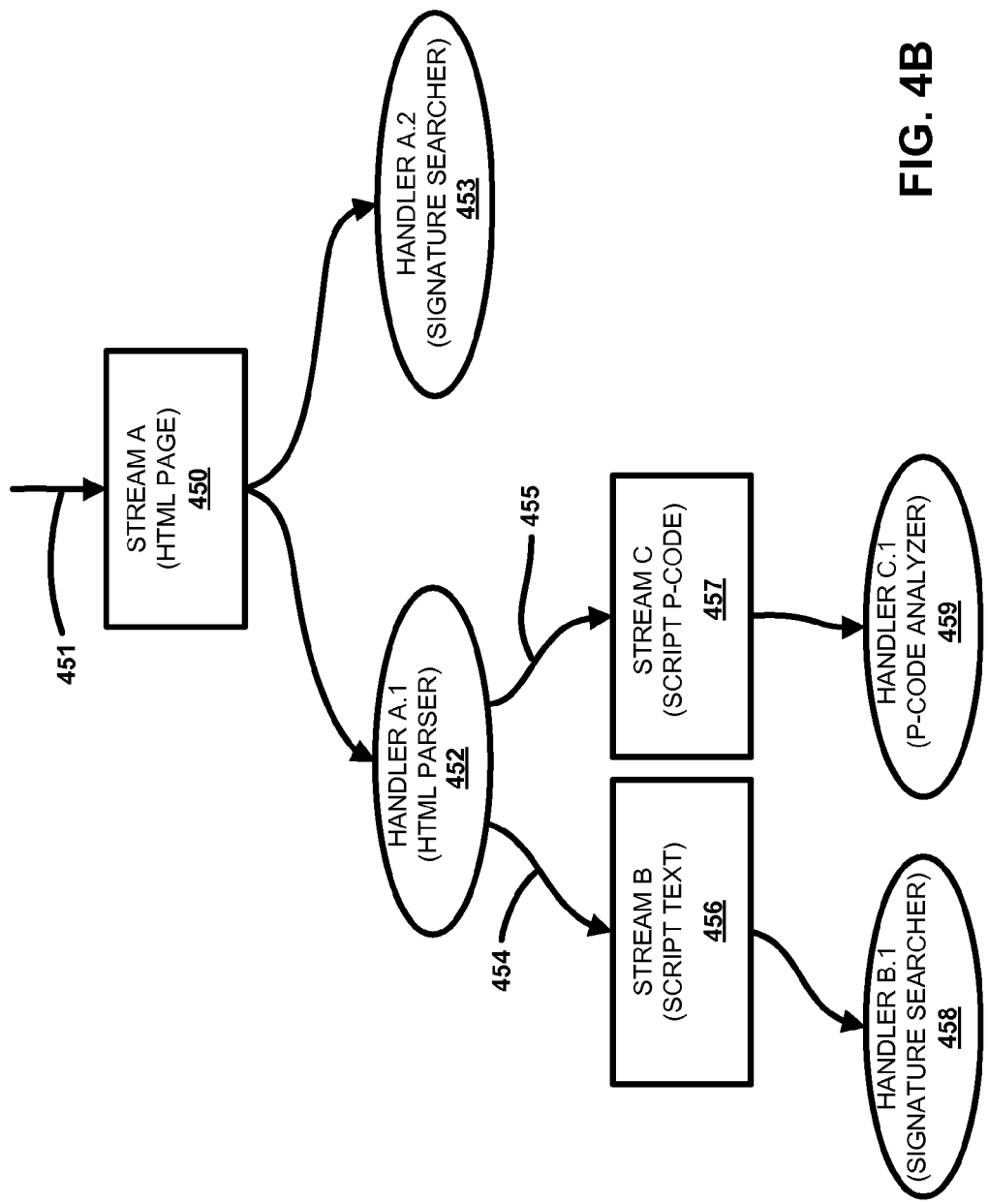
FIG. 4B illustrates an example of a hierarchy similar to FIG. 4A, applied to a specific example of stream anti-virus analysis of HTML page.

FIG. 4B illustrates the example of data stream hierarchy during the anti-virus analysis of data stream, having the HTML format, commonly used for presentation of Web page content. The HTML format itself can be considered virus-safe, however, it can contain portions of "active content" usually in the form of embedded scripts, applets and portions of executable code (so-called ActiveX objects). These objects are often used by malware writers as a carrier of various malicious code.

The process of anti-virus analysis of scripts embedded in HTML pages typically includes a step of "normalization" of the script text, when the plain text is transformed into some form of pseudocode (P-CODE). This normalization reduces the variability of script text, and makes it more convenient to analyze it (for example, using signature searching).

Signature searching is used to detect known byte patterns that uniquely identify presence of malware in a portion of data. Malware signatures may have a different form, from simple byte strings to regular expressions or some customized format. Typically, signature search algorithms use a database of known virus signatures and perform simultaneous search for all signatures in the database. To achieve high throughput, signature search algorithms can be implemented using hardware acceleration.

Here, data stream "STREAM A" (450) receives data directly from the primary data stream 451.

STREAM A (450) has two associated processing handlers: HANDLER A.1 (452) and HANDLER A.2 (453). Thus, the data buffered by manager STREAM A (450) is passed both to HANDLER A.1 (452) and HANDLER A.2 (453). In this example, HANDLER A.1 (452) parses the HTML format, identifying areas that may contain active content (scripts, applets, etc). HANDLER A.2 (453) performs signature scanning of the source HTML stream, looking for the signatures of malicious data objects that can be found directly in the HTML data stream without further processing. HANDLER A.1 (452) produces two distinct output data formats (see 454, 455) that are buffered using data streams STREAM B (456) and STREAM C (457). The content of STREAM B (456) is a normalized script text (for example, lower-cased, with trimmed spaces and removed comments). The content of STREAM C (457) is a script pseudocode (P_CODE).

Both data streams STREAM B (456) and STREAM C (457) have a single associated processing handler each: HANDLER B.1 (458) and HANDLER C.1 (459), respectively.

Processing handler HANDLER B.1 (458) performs signature search on the content of normalized script text.

Processing handler HANDLER C.1 (459) performs P-CODE analysis (using signature search or optionally employing advanced techniques, e.g. static control flow analysis and emulation).

HANDLER A.2 (453), HANDLER B.1 (458), HANDLER C.1 (459) do not produce any output data streams, instead they may generate stream control notifications 312 to indicate progress of stream analysis.

Note that, optionally, certain aspects of the processing handlers 306 can take advantage of hardware acceleration. For example, customized and standard integrated circuits are available for rapid scanning of a data stream for multiple virus signatures. Many data compression and encoding algorithms (e.g., LZW, LZSS, Inflate) can also be implemented in hardware, with the software-implemented processing handler using customized APIs of those integrated circuits to perform certain operations on the stream data, e.g., virus signature scanning, decoding/decompressing, etc. Any of these solutions can be used in the present invention.

Figure 5:
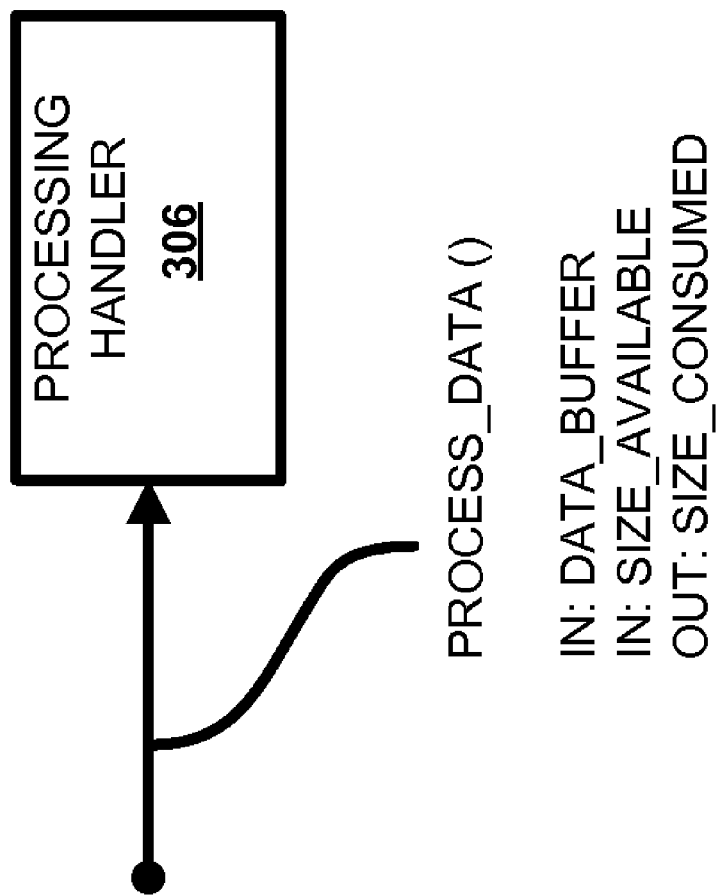
FIG. 5 illustrates a processing handler in additional detail.

A programming interface of a typical processing handler 306 is illustrated in FIG. 5 in a simplified form. Processing handler 306 implements a method PROCESS_DATA. That method accepts two input parameters: reference to buffered data (DATA_BUFFER) and size of data available in the buffer (SIZE_AVAILABLE). During execution of the PROCESS_DATA method, processing handler 306 "consumes" some amount of data. The amount of data consumed can be less than the amount of available data. The reason for this is that some processing handlers may require certain amount of input data to perform its processing (for example, it might wait for a certain protocol header to be fully received before looking at its contents).

The amount of data, consumed and processed by processing handler 306, is returned via the output parameter (SIZE_CONSUMED). If the data stream buffer 302 is associated with more than one processing handler 306, each processing handler 306 might consume different amount of stream buffer data. Note that the system keeps track of how much data has been processed by each handler, associated with the data stream, and what portion of buffered data has not yet been processed by a handler. Furthermore, if the stream has been assigned to several handlers, different handlers might have different amounts of data that they have processed.

Figure 6:
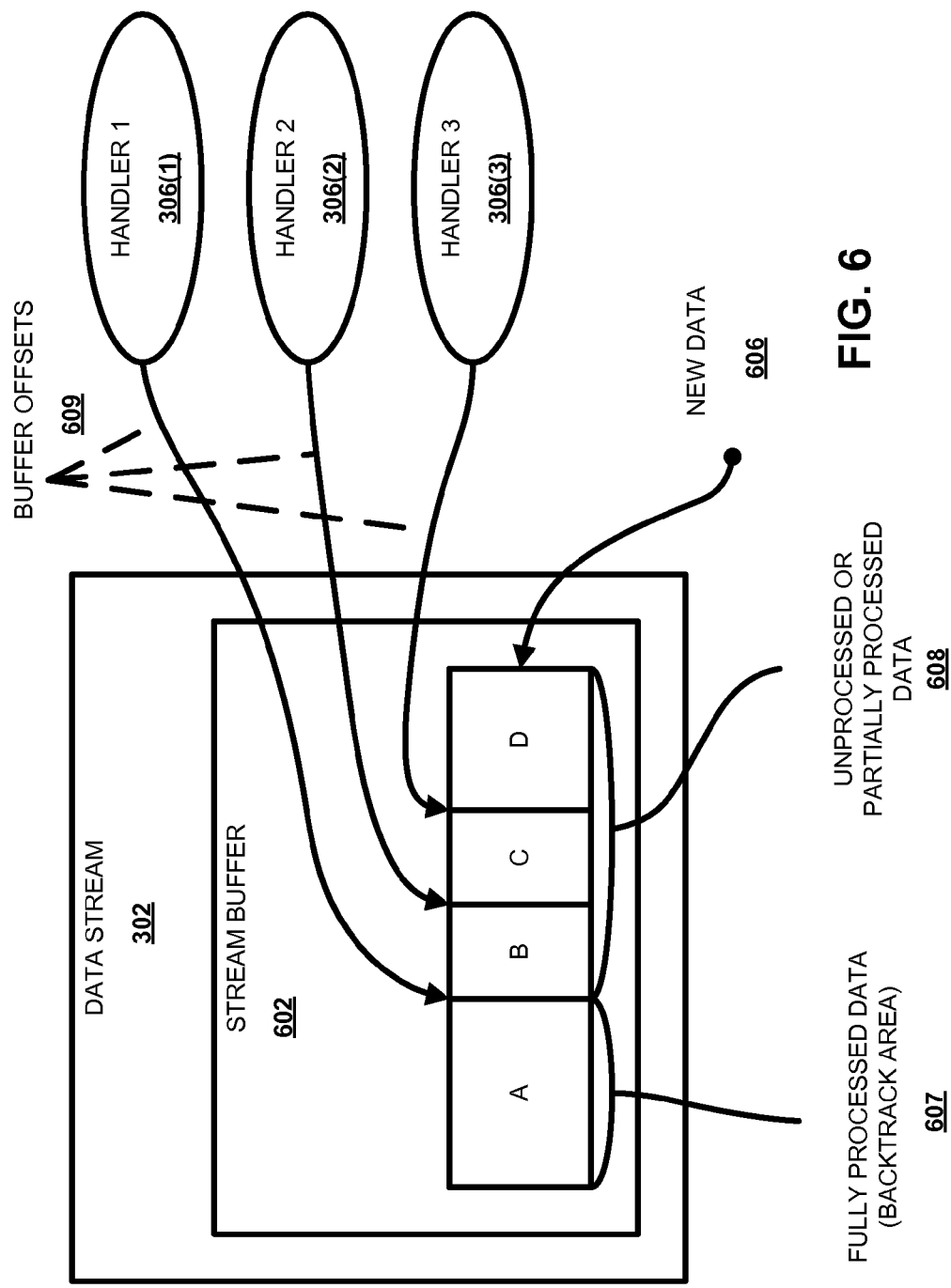
FIG. 6 illustrates operation of another embodiment of a stream buffer of the present invention, particularly relating to unprocessed data.

FIG. 6 illustrates the case when one data stream 302 is associated with three processing handlers 306(1), 306(2) and 306(3). To accommodate multiple processing handlers, the stream data buffer 602 maintains a separate buffer offset 609 for each associated processing handler.

In this figure, stream data buffer 602 can be logically split into areas, one of which (607) contains the data processed by all handlers and the other (608) the data that has not yet been processed by any handler.

Buffer offsets are maintained according to the following algorithm:

When the next input data portion 606 arrives, the data stream 302 calls the PROCESS_DATA method (see FIG. 5) for each attached processing handler. Then, buffer offsets 608 are updated according to the amount of data consumed by each handler. The minimal value of buffer offsets is taken as the offset of fully processed data (area 607).

In FIG. 6, the amount of data processed by handler 306(1) is equal to buffer area A, by handler 306(2), equals to the sum of areas A and B, by handler 306(3) to the sum of areas A, B and C. Area D contains data that could not yet have been processed by any of the handlers.

The data in the area A can be discarded from the buffer 602.

However, in some circumstances, it may be desirable to keep some amount of data that has been already processed. In some cases, the anti-virus processing algorithm can dynamically register a new processing handler 306 that points to the data in the area, containing already processed area. As a practical example, when a first processing handler analyzes the first few bytes from the data stream and "recognizes" that the data has a certain format, then that processing handler creates and registers another processing handler. The second handler performs the actual processing of the correspondingly formatted stream data. The second processing handler then starts processing data from the beginning of the stream, the area containing data that has already been processed by the first processing handler. Thus, the new handler is registered with a stream offset in the backtrack area, see 306(N) in FIG. 7.

Figure 7:
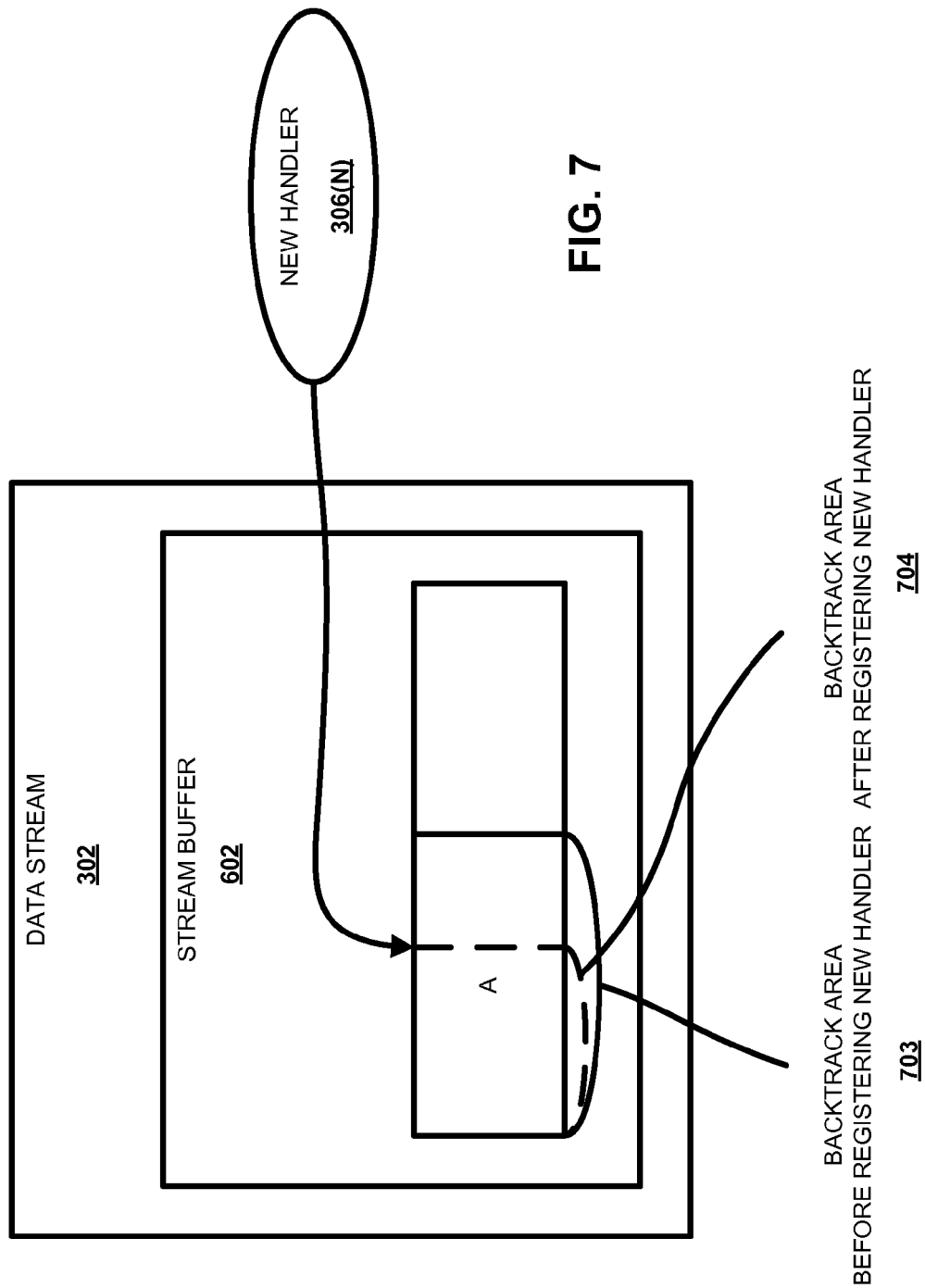
FIG. 7 illustrates an example of instantiation of a new processing handler.

This case is illustrated in FIG. 7. A new processing handler 306(N) is registered such that it points to the data in backtrack buffer area 703. After the registration, stream buffer 602 updates the size of the backtrack area (which, in 2006, is typically on the order of 4 KB-16 KB) to the new value 704.

Figure 8:
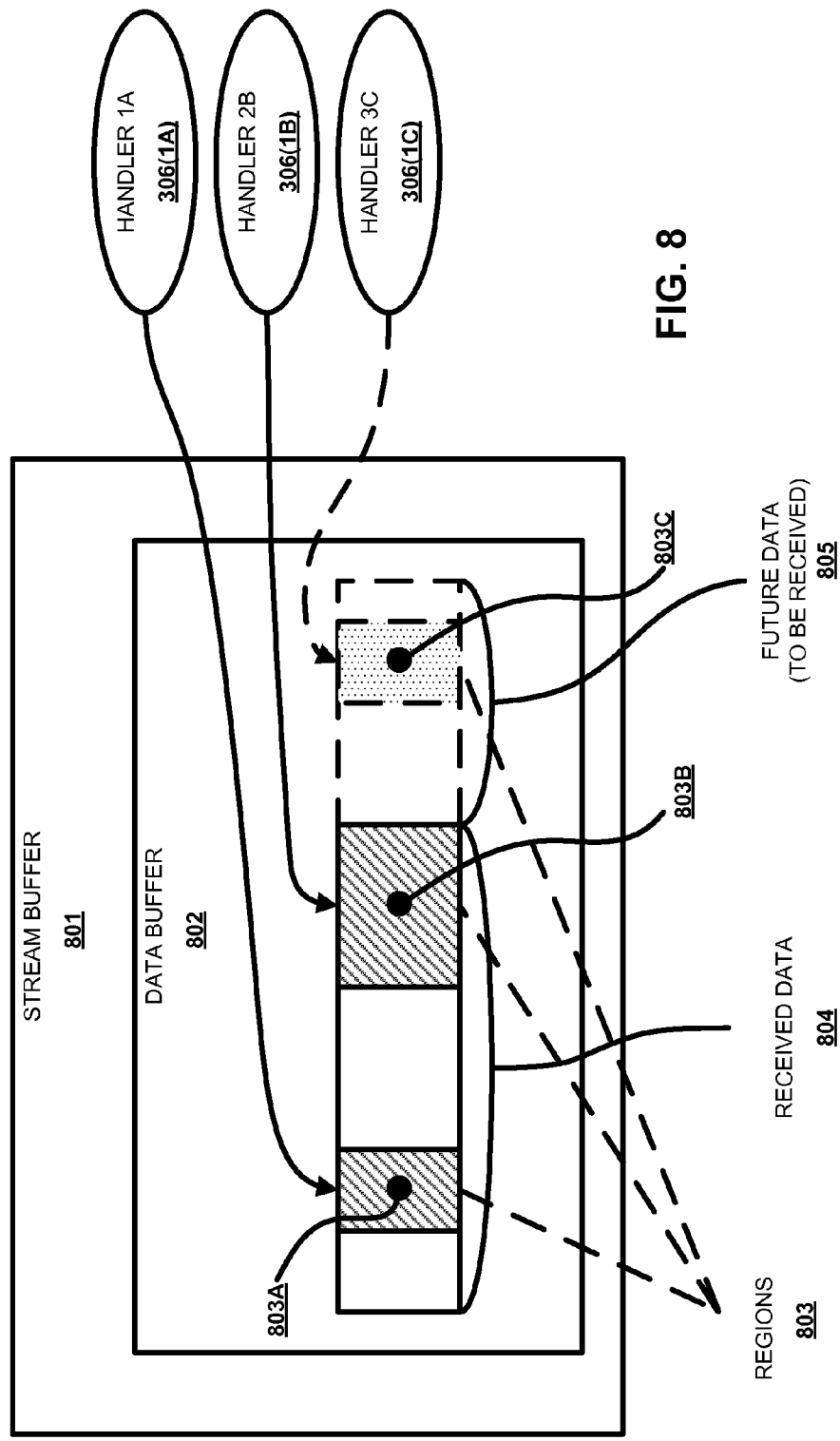
FIG. 8 illustrates an example of a data stream with multiple processing handlers having stream buffer with multiple regions of stream data being processed by the processing handlers.

FIG. 8 illustrates another embodiment, where the data stream 801 and its stream buffer 802 has a more complex structure. The stream buffer 802 allows buffering of several non-contiguous stream "regions". Regions can be registered both in the already-received portion of the stream data (804) and in the 'not yet received' portion (in the "future" data 805 in FIG. 8). Locations of regions in "future" data can be determined by analyzing the headers of the files being transmitted, which identify where, in the entire object being transferred (e.g., an executable file), there are sub-elements, such as section of executable code, resources, etc. These regions are associated with the information what actions must be performed when the actual data for these regions is received. Such action, for example, may involve creation of new instances of stream processing handlers associated with the data belonging to the region.

FIG. 8 illustrates the stream data buffer 802 with multiple registered regions and associated processing handlers. As shown in FIG. 8, data stream 801 contains the stream buffer 802 that holds several buffered stream regions 803: region 803A, 803B, 803C. Regions 803A and 803B are registered in the already processed area 804 of the stream data. Region 803C is registered in the "future" area 805 of the stream data. Processing handlers 306(1A), 306(1B) and 306(1C) process data from the regions 803A, 803B and 803C respectively (although not shown, several processing handlers can process data from the same region).

In the described embodiment, anti-virus/anti-malware processing algorithms can dynamically register new regions and associate actions that will be executed when that region's data becomes available.

Figure 9:
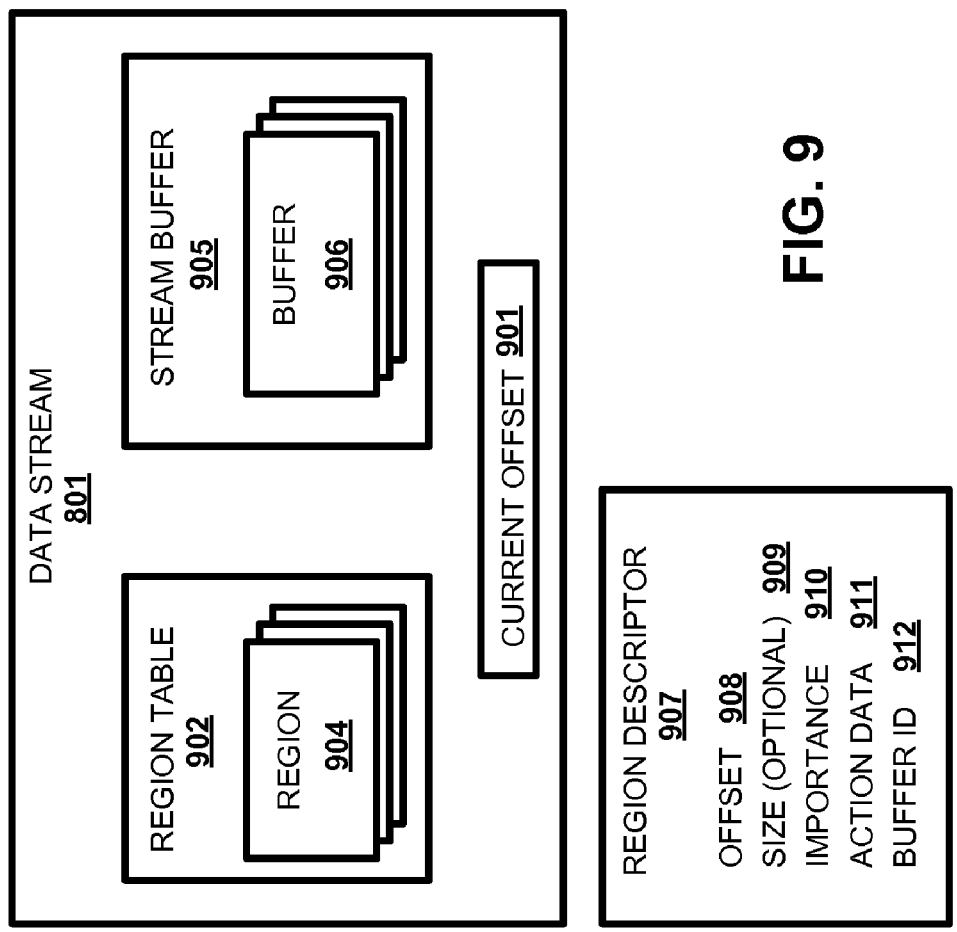
FIG. 9 illustrates an example of an architecture of a stream buffer with dynamic region allocation.

FIG. 9 illustrates an internal architecture of the data stream object 801 that allows dynamic allocation of stream regions 803. Here the data stream 801 includes a region table 902 and a stream buffer 905 that may contain memory buffers corresponding to different regions. The region table 902 contains a list of region descriptors 904 registered with the current stream. Buffer pool 905 contains a list of memory buffers 906 holding stream data corresponding to buffered regions.

Each region descriptor can contain the following information:

Stream offset 908: byte offset from beginning of the data stream, where the region begins;

Region size 909: size of region data (in some cases, it may not be known in advance);

Importance 910: determines whether the buffered data for this region can be discarded in a low-memory condition;

Action data 911: actions that must be performed when the region data becomes available in the input stream.

Buffer ID 912: identifier of the memory buffer corresponding to that region. For the regions not yet reached (future data) or those already discarded, the buffer ID is not present.

When the data stream 801 receives portion of input data, it updates the value of the current stream offset 901. This value of the offset 901 is compared to the value of starting stream offset 908 of registered regions. If the portion of the received data falls inside the range of some registered region, a new memory buffer is allocated to store data for the region and the region is "activated", that is, the system 350 executes actions associated with this region (action data 911).

Actions data 911 may contain the name of the procedure that can be called or some instructions to be executed by the system 350. The performed actions may involve creation of new instances of processing handlers 306 and associate them with the data stream 801 at an offset, corresponding to the starting offset of the region 908.

Processing handlers 306 may in turn create instances of secondary data streams 302 and perform anti-virus processing actions. If the region 803 has the size 909 defined, then the system can automatically deregister region and release memory buffer 906 when the value of current stream offset 901 becomes greater than the value of the starting region offset 908 plus the value of region size 909.

Figure 10:
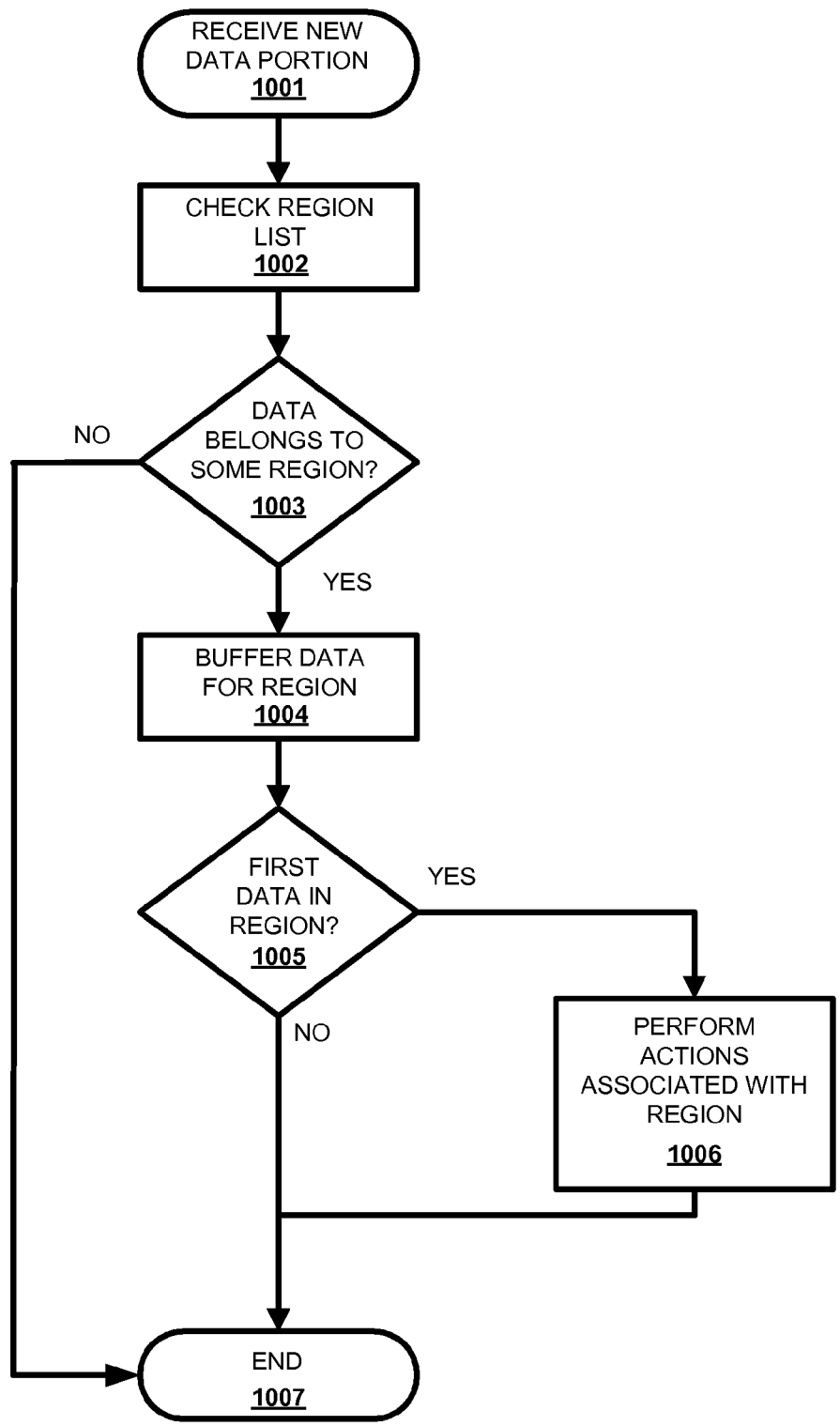
FIG. 10 illustrates one embodiment of operation of the present invention in a flowchart form.

FIG. 10 is a flowchart illustrating the process. As shown in FIG. 10, in step 1001, a new data portion is received. In step 1002, the data stream checks the list of regions, as discussed earlier, to see if the data that is being received has already been associated with a region. In step 1003, if the data belongs to a previously identified region, then in step 1004 the data of the region is placed in the buffer (and, if necessary, a new memory segment will be allocated for the stream buffer). In step 1005, if this is first data in the region, then, in step 1006, the system 350 performs actions associated with this region, for example, instantiation of new processing handlers, parsing of MIME or HTML objects, unpacking of archived objects, scanning of executable files, etc. The process ends in step 1007. In step 1003, if the data does not belong to any region, it is not buffered at all, and the process also terminates in step 1007.

In other embodiments, the data stream 801 can aggressively buffer the received data for the whole stream, even for areas not belonging to registered regions. For such an approach, new regions can be registered in the "past" area of stream (i.e., in the area, where data can be normally discarded) (see 804 in FIG. 8). If the data for the region 803A is available in the buffer, the region 803A is activated and its configured actions are executed.

It should be noted that some of the handlers 306 may be tasked with parsing HTML pages, identifying scripts in the page and checking those scripts for virus signatures. Other stream processing tasks that a handler might face are considerably more complex. For example, many attachments today are sent in an archived or encoded form. For example, zip archives and RAR archives can be used, and viruses often are embedded in the packed (archived) files. Therefore, if the object being transmitted is an email, the attachment needs to be identified, for example, using headers, and then unpacked.

The handler, therefore, by parsing the body of the email, can identify the password (or a set of possible passwords), and try using them to unpack the encrypted file. Similarly, many Microsoft Word or Adobe Acrobat PDF files can also be protected by passwords (and can also include virus code as well). In some cases, the body of the email might also contain the password. In the context of the present discussion, the parsing of the email body can be done by the same handler or can be done by a different handler, for example, the one specifically instantiated for this purpose.

Thus, yet another difficulty faced by the stream processing approach is encryption or other forms of protection for the archived object. In some cases, the encryption is a necessary security feature for transmission of confidential data. In other cases, the encryption is specifically designed to defeat the anti-virus stream processing systems. For example, there are many forms of spam that transmit attachments in packed and encrypted formats. One approach to addressing this issue is to rely on an empirical observation that for many forms of malicious transmissions, such as spam-type emails with archived attachments, the body of the email frequently contains the password needed to unpack the archived file. Since the nature of the spam is such that the spammer has no realistic way of communicating with the recipient, other than the email itself, sending a packed and encrypted file would be a useless exercise, if the recipient were unable to open it. Therefore, the body of the email of such spam transmissions might include the password.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A system for anti-malware processing of data stream, the system comprising:
   a processor;
   a memory coupled to the processor;
   a plurality of elements stored in the memory and executed by the processor, the elements comprising:
   dividing a primary data stream to form a plurality of logical data streams, wherein each logical data stream has a different data format;
   a plurality of stream buffers, each stream buffer buffering data of a corresponding logical data stream;
   a plurality of processing handlers separated from the stream buffers, each processing handler associated with one of the stream buffers and processing the data of the logical data stream buffered by its stream buffer,
   wherein:
   each logical data stream is processed inside the processing handler associated with the stream buffer; and
   each processing handler is associated with a particular data transmission mode and at least one of the processing handlers scans its logical data stream for malware presence, and
   wherein at least several of the plurality of processing handlers are associated with a single stream buffer buffering data, and wherein different processing handlers extract different amounts of the same data buffered by the single stream buffer, and
   wherein the data is deleted from the single stream buffer only after multiple processing handlers associated with the single stream buffer have processed the same data.

2. The system of claim 1, wherein each stream buffer has configurable buffering policy that is defined when that instance of stream buffer is created.

3. The system of claim 1, wherein each stream buffer has an individually configurable buffering policy that is defined at a time of its instantiation.

4. The system of claim 3, where the buffering policy includes any of information about maximum buffer size, whether the data stream must be fully buffered, a size of a backtrack buffer, relative importance of buffered data for later processing and whether the buffered data can be dropped when available memory is low.

5. The system of claim 1, wherein the corresponding processing handler identifies archived files in the logical data stream corresponding to an email, wherein the archived files represent attachments, and wherein the processing handler parses a body of the email to identify password information needed to unpack the archived files.

6. The system of claim 1, wherein at least one of the processing handlers decompresses the data into one or more logical data streams.

7. The system of claim 1, wherein at least one of the processing handlers parses its logical data stream, creating one or more instances of secondary data streams.

8. The system of claim 7, wherein the logical data stream is transmitted using a transmission mode of any of hypertext (HTTP), mail protocols, including any of SMTP, POP, and IMAP, file transfer protocols, including any of SMB and FTP, and instant messaging protocols, including ICQ protocols.

9. The system of claim 7, wherein the logical data stream uses a transmission mode of any of hypertext formats, including any of HTML and MIME, archive formats, including any of GZIP, ZIP, RAR, and ARJ formats, compound document formats, including OLE2 formats, executable file formats, including PE and ELF formats, dynamic content formats, including SWF formats, and media formats, including, GIF, JPEG, PNG, WAV, MPEG, MP3 and AVI formats.

10. The system of claim 1, wherein the at least one processing handler performs malware scanning using a signature search.

11. The system of claim 1, wherein at least one of the processing handlers uses hardware acceleration.

12. The system of claim 1, where each stream buffer keeps track of an amount of data consumed by their corresponding associated processing handlers.

13. The system of claim 1, wherein new instances of data streams are created based on logical data stream offset and action to be performed when the new instance of a logical data stream is created, is defined at time of creation of the logical data stream.

14. The system of claim 1, wherein at least one of the processing handlers parses its logical data stream to identify headers and wherein new secondary stream buffers are instantiated based on regions of interest in a future data stream identified by the headers.

15. The system of claim 1, further comprising a set of conditions for creation of new instances of stream buffers, wherein the set of conditions is stored in any of a table, a list, and a registry.

16. A method for anti-malware processing of data stream, the method being performed on a computer having a processor and a memory, the method comprising:
   generating a plurality of logical data streams by dividing a primary data stream, wherein each logical data stream has a different data format;
   instantiating a plurality of stream buffers, each stream buffer buffering data of a corresponding logical data stream;
   instantiating a plurality of processing handlers separated from the stream buffers, wherein each processing handler scans data of the logical data stream buffered by its stream buffer for malware presence;

associating each processing handler with one of the logical data streams, wherein each logical data stream is processed inside the associated processing handler; and associating each processing handler with a particular data transmission mode, and wherein at least several of the plurality of processing handlers are associated with a single stream buffer buffering data, and wherein different processing handlers extract different amounts of the same data buffered by the single stream buffer, and wherein the data is deleted from the single stream buffer only after multiple processing handlers associated with the single stream buffer have processed the same data.

17. The method of claim 16, further comprising configuring a buffering policy of each stream buffer upon an instantiation of each logical data stream.

18. The method of claim 16, further comprising parsing at least one logical data stream to identify headers, and wherein new secondary data streams are instantiated based on regions of interest in a future data stream identified by the headers.

19. The method of claim 16, further comprising identifying archived files in the logical data stream corresponding to an email, wherein the archived files represent attachments, and parsing a body of the email to identify password information needed to unpack the archived files.

20. The method of claim 16, where the buffering policy includes any of information about maximum buffer size, whether a logical data stream must be fully buffered, a size of a backtrack buffer, relative importance of buffered data and whether portions of buffered data can be discarded when available memory is low.

21. The method of claim 16, wherein at least one of the processing handlers decompresses the data into one or more secondary data streams.

22. The method of claim 16, further comprising parsing at least one logical data stream using at least one processing handler, and instantiating one or more secondary stream buffers.

23. The method of claim 16, wherein the scanning uses a signature search.

24. The method of claim 16, further comprising instantiating new instances of data streams are created based on logical data stream offset and action that is to be performed when the new instance of a logical data stream is created is defined at time of creation of the logical data stream.

25. The method of claim 16, further comprising storing a set of conditions for instantiating new stream buffers in any of a table, a list, and a registry.

26. A system for anti-malware processing of data stream, the system comprising:
a processor; a memory coupled to the processor;
a plurality of elements stored in the memory and executed by the processor, the elements comprising:
a plurality of logical data streams separated out from a primary data stream based on a data format;
a plurality of stream buffers, each stream buffer buffering data of a corresponding logical data stream; and
a plurality of processing handlers separated from the stream buffers, each processing handler associated with a corresponding stream buffer and processing the logical data stream stored by its stream buffer, and each processing handler associated with a particular data transmission mode, wherein each processing handler scans its logical data stream for malware presence,
wherein each logical data stream is processed inside the associated processing handler, wherein at least some of the processing handlers identify, using header information, location of regions of interest in future data in the primary data stream and instantiate new instances of stream buffers to buffer the data in the regions of interest,
wherein at least one of the processing handlers is adapted to parse an email body for password information, and
wherein at least one other processing handler is adapted to unpack archived files based on the password information, and
wherein at least several of the plurality of processing handlers are associated with a single stream buffer buffering data, and wherein different processing handlers extract different amounts of the same data buffered by the single stream buffer, and
wherein the data is deleted from the single stream buffer only after multiple processing handlers associated with the single stream buffer have processed the same data.

27. A system for anti-malware processing of data stream, the system comprising:
a processor; a memory coupled to the processor;
a plurality of elements stored in the memory and executed by the processor, the elements comprising:
a primary data stream that includes emails with archived password-protected attachments;
a plurality of stream buffers, each stream buffer buffering data of a corresponding portion of the emails, wherein the portions include any of email body and the archived password-protected attachments; and
a plurality of processing handlers separated from the stream buffers, each processing handler associated with a corresponding stream buffer and processing the portion of the email stored by its stream buffer,
wherein each portion of the email is processed inside the associated processing handler;
wherein each processing handler scans its portion of the email for malware,
wherein at least some of the processing handlers identify, using header information, location of attachments in future data in the primary data stream and instantiate new instances of stream buffers to buffer the attachments, and
wherein at least one of the processing handlers parses the email body for passwords for the attachments used to unpack the attachments, and
wherein at least several of the plurality of processing handlers are associated with a single stream buffer buffering data, and wherein different processing handlers extract different amounts of the same data buffered by the single stream buffer, and
wherein the data is deleted from the single stream buffer only after multiple processing handlers associated with the single stream buffer have processed the same data.

28. A system for anti-malware processing of data stream, the system comprising:
a processor; a memory coupled to the processor;
a plurality of elements stored in the memory and executed by the processor, the elements comprising:
a logical data stream receiving input data portion by portion from a primary data stream, wherein the logical data stream receives data of a particular format;
a stream buffer, assigned to the logical data stream, buffering the last N bytes associated with the logical data stream;
a plurality of processing handlers separated from the stream buffer assigned to the logical data stream, wherein a portion of buffered data is passed to all the assigned processing handlers and each processing handler is permitted to consume less data than the entire portion, and the remainder of the buffered data, that has not yet been consumed, is passed to one of the plurality of processing handlers together with the next portion of input data when the next portion becomes available in the stream buffer, wherein each portion of the buffered data is processed inside the assigned processing handler;

wherein at least one of the processing handlers scans its associated data for malware presence, wherein the amount of data consumed by different processing handlers from the same portion of buffered data is not the same, and wherein at least several of the plurality of processing handlers are associated with a single stream buffer buffering data, and wherein different processing handlers extract different amounts of the same data buffered by the single stream buffer, and wherein the data is deleted from the single stream buffer only after multiple processing handlers associated with the single stream buffer have processed the same data.

29. A non-transitory computer readable storage medium having computer executable program logic stored thereon, the computer executable program logic executing on a processor for anti-malware processing of data stream, the computer program logic comprising:

computer program code means for generating a plurality of logical data streams by dividing a primary data stream, wherein each logical data stream has a different data format;

computer program code means for instantiating a plurality of stream buffers, each stream buffer buffering data of a corresponding logical data stream;

computer program code means for instantiating a plurality of processing handlers separated from the stream buffers, wherein each processing handler scans data of the logical data stream buffered by its stream buffer for malware presence;

computer program code means for associating each processing handler with one of the logical data streams, wherein each logical data stream is processed inside the associated processing handler; and computer program code means for associating each processing handler with a particular data transmission mode, and wherein at least several of the plurality of processing handlers are associated with a single stream buffer buffering data, and wherein different processing handlers extract different amounts of the same data buffered by the single stream buffer, and wherein the data is deleted from the single stream buffer only after multiple processing handlers associated with the single stream buffer have processed the same data.

* * * * *